Figure 1:
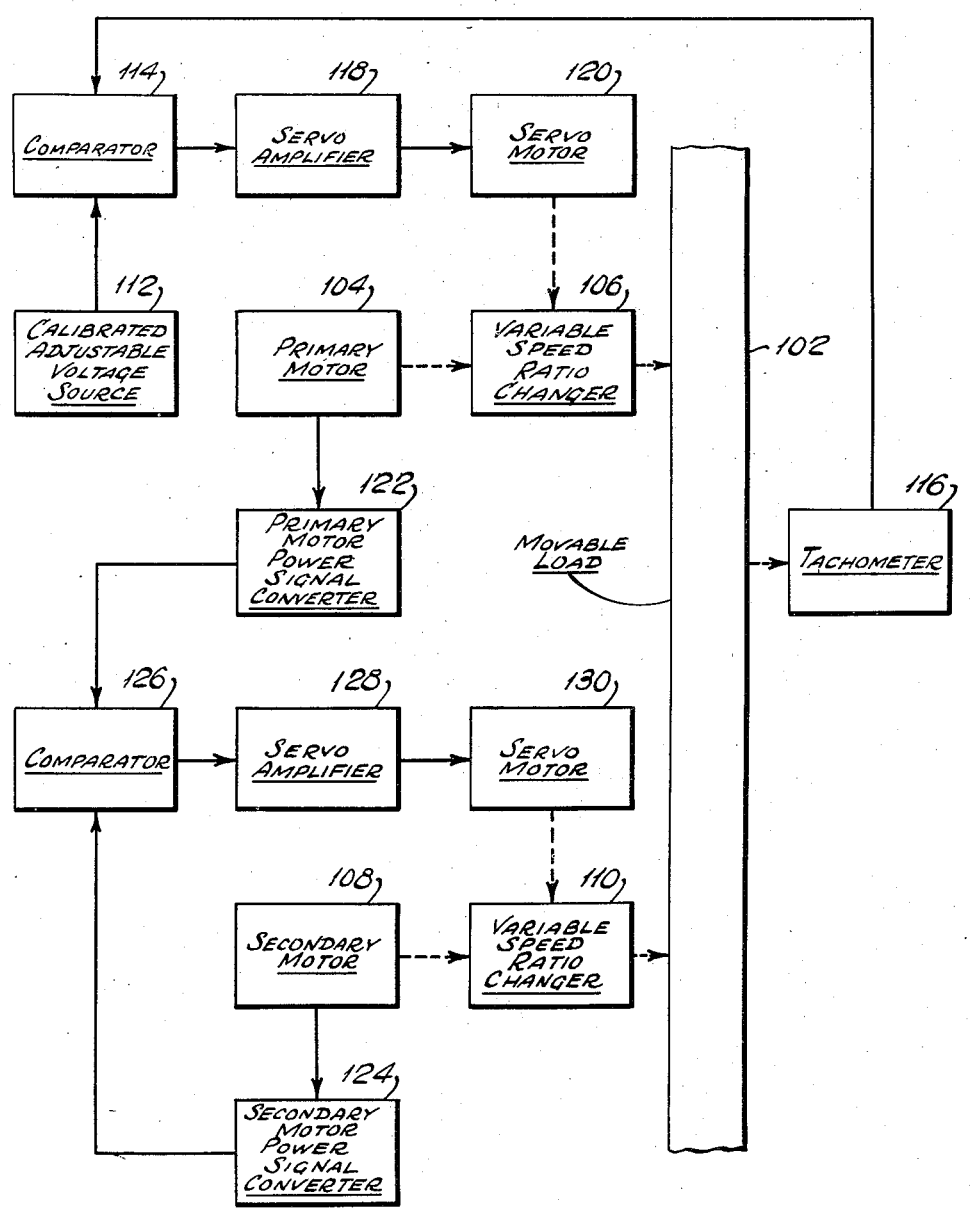

Dec. 9, 1958 D. M. TROTSKY 2,864,040
MULTIPLE ELECTRIC MOTOR DRIVE SYSTEM
Filed Feb. 1, 1955 2 Sheets-Sheet 1

INVENTOR
DAVID M. TROTSKY
BY George Lipkin
Lee J. Hunsberger
ATTORNEY

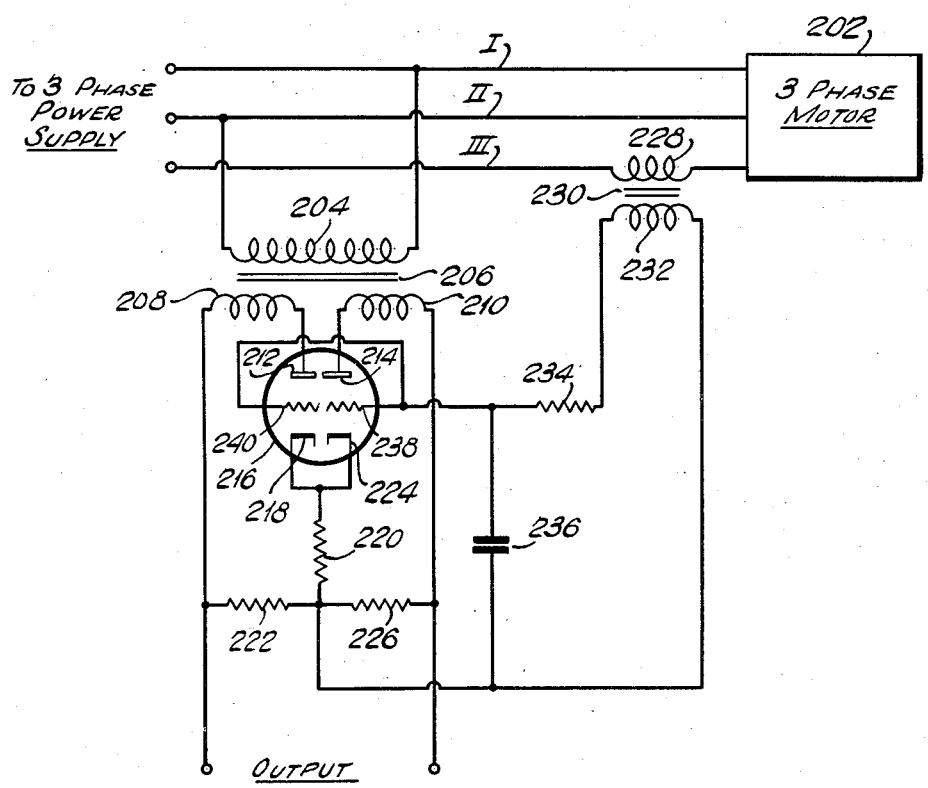

United States Patent Office 2,864,040
Patented Dec. 9, 1958

2,864,040

MULTIPLE ELECTRIC MOTOR DRIVE SYSTEM

David M. Trotsky, Webster, Mass.

Application February 1, 1955, Serial No. 485,629

11 Claims. (Cl. 318—8)

(Granted under Title 35, U. S. Code (1952), sec. 266)

The invention described herein may be manufactured and used by or for the Government of the United States of America for governmental purposes without the payment of any royalties thereon or therefor.

This invention relates to a multiple drive system, and more particularly, to a servo speed and power control for mechanically adjustable speed machines used in a multiple drive system.

The use of a multiple drive system for operating a single movable load, such as a conveyor or the like, is well known in the art. The multiple drive system usually consists of a plurality of electric motors, each of which is individually coupled to the movable load by a variable speed ratio changer. The variable speed ratio changers permit the speed of the movable load to be adjusted over a wide range.

In the past there has been no central control for adjusting the various variable speed ratio changers. The common practice was to set the speed indicator on each ratio changer at identical readings. However, it is very improbable that such settings will result in each of the motors delivering its proportional share of power to the movable load, since backlash, wear and tear, and disassembly and re-assembly of the motors and ratio changers cause inaccuracies in the indicator readings. Therefore, one or more of the motors can easily be overloaded, resulting in excessive wear therein or in the ratio changer. Also, should there be a difference in the ratios of two identically set ratio changers, the resulting operation would cause one or more of the drives to slip. Such an operation produces undue wear in the slipping drives.

Briefly, this invention contemplates the use of one primary drive and one or more secondary drives. A servo system is provided for comparing the power consumed by each of the secondary drives in operating the movable load with the power consumed by the primary drive in operating the movable load. If the power consumed by a secondary drive is either more or less than its proportionate share, the output of the servo system adjusts the setting of the variable speed ratio changer of that secondary drive to provide a correction in the power consumed thereby. In order to adjust the speed of the movable load, a second servo system is provided, which compares the output of a tachometer coupled to the movable load with the output of a calibrated adjustable voltage source representative of the desired speed. The output of the second servo system adjusts the setting of the variable speed ratio changer of the primary drive to alter the speed of the movable load so as to make it equal to the desired speed. However, the adjustment of the setting of the variable speed ratio changer of the primary drive varies the power consumed by the primary motor. This causes a readjustment in the settings of the variable speed ratio changers of the secondary drives by means of the first-mentioned servo system.

It is, therefore, an object of this invention to provide a multiple drive system for a movable load wherein the power actually consumed by each of the drives in moving the movable load is in proportion to the power rating of that drive.

It is a further object of this invention to provide a variable speed multiple drive system for a movable load wherein the speed of all the drives may be adjusted by means of a single speed selector at a remote station.

It is a further object of this invention to provide a unique circuit for producing a voltage having a magnitude proportional to the power consumed by a three-phase electric machine in operating a load.

Other objects and many of the attendant advantages of this invention will be readily appreciated as the same becomes better understood by reference to the following detailed description when considered in connection with the accompanying drawings wherein:

Fig. 1 is a preferred embodiment of a multiple drive system employing the principles of this invention; and Fig. 2 is a schematic circuit diagram of a power signal converter utilized in this invention.

Referring now to Fig. 1, movable load 102 is moved by primary motor 104 which is coupled thereto through variable speed ratio changer 106, and by secondary motor 108 which is coupled thereto through variable speed ratio changer 110. Motors 104 and 108 may be direct current motors, one phase alternating current motors or three phase alternating current motors.

The output from calibrated adjustable voltage source 112 and the output from tachometer 116, which is coupled to movable load 102, are applied as inputs to comparator 114. Comparator 114 is a differential mixer which provides an output proportional to the difference between the magnitudes of its two inputs. The comparator extracts the difference between the two voltages. Any algebraic summing circuit will perform this function. As an example, see reference M. I. T. Radiation Lab., Series 21, "Electronic Instruments," chapter 3. The coils 27 and 29 with parts controlled thereby in U. S. patent to Merrill, No. 1,631,752, is a simple comparator. The output of comparator 114 is applied as an input to servo amplifier 118. Servomotor 120, which is energized by the output from servo amplifier 118, is coupled to the speed adjustor of variable speed ratio changer 106.

Primary motor power signal converter 122 is connected to primary motor 104 and secondary motor signal converter 124 is connected to secondary motor 108. Each of signal converters 122 and 124 produces an output proportional to the power consumed by the motor to which it is connected in operating movable load 102. The circuit of a unique signal converter for use with three-phase motors is shown in Fig. 2.

The outputs of signal converters 122 and 124 respectively, are applied as first and second inputs to comparator 126. Comparator 126, which is similar to comparator 114, is preset in accordance with the relative power ratings of the primary and secondary motors to provide an output proportional to the difference between the output from the signal converter connected to the motor with the smaller power rating and a portion of the output from the signal converter connected to the motor with the larger power rating, this portion being equal to the ratio between the power ratings.

The output from comparator 126 is applied as an input to servo amplifier 128. Servo motor 130, which is energized by the output from servo amplifier 128, is coupled to the speed adjuster of variable speed ratio changer 110.

Considering now the operation of the multiple drive system shown in Fig. 1, the output of tachometer 116, which is proportional to the actual speed of movable load 102, is compared with the output of calibrated adjustable voltage source 112, which is representative of the desired speed of movable load 102, in comparator 114.

Servo motor 120, which is energized by a signal proportional to the error between the actual and desired speeds of the movable load, varies the setting of the speed adjuster of variable speed ratio changer 106. Varying the setting of the speed adjuster of variable speed ratio changer 106 causes the speed of movable load 102 to be changed in such a direction as to approach the desired speed set on calibrated adjustable voltage source 112.

However, the variation in the setting of the speed adjuster of variable speed ratio changer 106 also causes the power consumed by primary motor 104 to be altered. Therefore, an unbalance is created in the inputs to comparator 126 from signal converters 122 and 124, respectively. Servo motor 130, which is energized by a signal proportional to this unbalance, varies the setting of the speed adjuster of variable speed ratio changer 110. Variation of the setting of the speed adjuster of variable speed ratio changer 110 alters the power consumed by secondary motor 108 in such a direction as to eliminate this unbalance. Thus, the two servo systems just discussed cooperate to adjust the speed of movable load 102 to any desired value set on calibrated adjustable voltage source 112, while at the same time distributing the portion of the load handled by each motor in accordance with the relative power rating of that motor.

Instead of a single secondary drive, as shown in Fig. 1, a plurality of secondary drives can be used. In that case, each of the secondary drives would be equipped with its own signal converter, comparator and servo system. The output from each individual secondary motor power signal converter would then be compared with the output from primary motor power signal converter 122.

Referring now to Fig. 2, there is shown a circuit of a power signal converter for use with a three-phase motor, or other machine, which may be coupled to a variable load. Three-phase motor 202 which corresponds to either motor 104 or 108 is energized from a three-phase power supply through inputs I, II and III. Primary winding 204 of transformer 206 is connected across inputs I and II to three-phase motor 202. Transformer 206 has two secondary windings 208 and 210 respectively. One end of secondary winding 208 is connected to anode 212 and one end of secondary winding 210 is connected to anode 214 of twin triode electron discharge device 216. Cathode 218 of electron discharge device 216 is returned to the other end of secondary winding 208 through resistors 220 and 222. Cathode 224 is returned to the other end of secondary winding 210 through resistors 220 and 226.

Primary winding 228 of transformer 230 is connected in series with input III to three-phase motor 202. One end of secondary winding 232 of transformer 230 is connected to control electrodes 238 and 240 of electron discharge device 216 through resistor 234. Capacitor 236 connects control electrodes 238 and 240 of electron discharge device 216 to the junction of resistors 220, 222 and 226.

The power signal converter shown in Fig. 2 is fundamentally a phase discriminator, which produces an output voltage proportional to the product of the amplitude of the voltage applied to each of anodes 212 and 214 of twin triode electron discharge device 216, the amplitude of the voltage applied to control electrodes 238 and 240 of twin triode electron discharge device 216 and the cosine of the phase angle between these two voltages. The amplitude of the voltage applied to each of anodes 212 and 214 is proportional to the voltage across inputs I and II to three-phase motor 202. The peak amplitude of the voltage applied to control electrodes 238 and 240 is proportional to the current through input III to three-phase motor 202.

Resistance 234 and capacitor 236 form a phase shift network which shifts the phase of the voltage applied to control electrodes 238 and 240 so that it is in phase quadrature with each of the voltages applied to anodes 212 and 214, when three-phase motor 202 is unloaded. This nullifies the internal power consumption of three-phase motor 202 and any objectionable phase shift due to the presence of transformers 206 and 230. Therefore the output voltage from the phase discriminator is proportional to only the power consumed by three-phase motor 202 in operating a load.

In Fig. 2 are indicated the limits of the circuits of signal converter 122 or 124, and the motor 202 represents either motor 104 or 108 depending upon whether the signal converter is 122 or 124 respectively. The 3 phase input of current, through lines I, II, and III of Fig. 2 is connected to both signal converters 122 and 124 of Fig. 1, because they are supplied with power from the same source the converters thus being connected in parallel to each other and to the input lines, which is shown schematically by lines "I, II, and III" in Fig. 2. The outputs of these signal converters 122 and 124, indicated at the bottom of Fig. 2, are connected to the comparator 126 which may be similar to comparator 114, and these connections, respectively, are indicated schematically by single lines in Fig. 1.

Obviously many modifications and variations of the present invention are possible in the light of the above teachings. It is therefore to be understood that within the scope of the appended claims the invention may be practiced otherwise than as specifically described.

I claim:

1. A system for operating a movable load by a plurality of power elements operating simultaneously, which comprises primary and secondary drives coupled to said load to operate it by joint effort, and each employing a three phase motor, first means for providing a first signal proportional to the power consumed by said primary drive in operating said load, second means for providing a second signal proportional to a desired ratio of the power consumed by said secondary drive in operating said load, servo means responsive to said signals for varying the power coupled from the secondary drive to said load in accordance with the difference between said first and second signals, each of said first and second means comprising a first transformer having a primary winding and first and second secondary windings; means for connecting the primary winding of said first transformer across two of the three-phase inputs to a respective one of said motors; an electron discharge device having at least first and second anodes, a control electrode and a cathode; means connecting one end of the first secondary winding of said first transformer to said first anode; means connecting one end of the second secondary winding of said first transformer to said second anode; first and second serially connected resistors; means connecting said serially connected first and second resistors between the other end of the first secondary winding and the other end of the secondary winding of said first transformer; a third resistor connected between said cathode and the junction of said first and second resistors; a second transformer having a primary winding and a secondary winding; means connecting the primary winding of said second transformer in series with the third of the three-phase inputs to said respective one of said motors, and a phase-shift network connecting the secondary winding of said second transformer between said control electrode and the junction of said first and second resistors, said network providing a phase shift such that the voltage between said control electrode and the junction of said first and second resistors is substantially in phase quadrature with the voltage between said anodes and the junction of said first and second resistors when said respective one of said motors is unloaded, whereby the voltage across said first and second serially connected resistors is proportional to the power consumed by said respective one of said motors in moving said movable load.

2. The combination in accordance with claim 1, wherein each drive includes a motor and a variable speed ratio changer coupling the motor to the load, and said servo means comprising a comparator; means applying said first and second signals as inputs to said comparator; said comparator producing an output proportional to the difference between said first and second signals; a servo amplifier; means applying the output of said comparator as an input to said servo amplifier; a servomotor coupled to and operated by the output from said servo amplifier, and means coupling the output of said servo motor to said variable speed ratio changer to vary the setting thereof.

3. The combination in accordance with claim 1, further comprising a voltage source for producing an output of adjustable magnitude; a tachometer coupled to said movable load for producing an output proportional to the speed of said movable load, and second servo means coupled between said voltage source and tachometer and said primary drive for varying the power coupled from said primary drive to said movable load in accordance with the difference between the output from said voltage source and the output from said tachometer, whereby said movable load will move at a speed determined by the magnitude of the output of said potentiometer.

4. The combination in accordance with claim 1, wherein said primary and secondary drives each comprise a motor and a variable speed ratio changer coupling said motor to said movable load.

5. The combination in accordance with claim 4, wherein said first-mentioned servo means comprises a first comparator, means applying said first and second signals as inputs to said first comparator, said first comparator producing an output proportional to the difference between said first and second signals, a first servo amplifier, means applying the output of said first comparator as an input to said first servo amplifier, a first servo motor coupled to and operated by the output from said first servo amplifier, and means coupling the output of said first servo motor to the variable speed ratio changer which forms said second means to vary the setting thereof, and said second servo means comprises a second comparator, means applying the outputs of said voltage source and said tachometer as inputs to said second comparator, said second comparator producing an output proportional to the difference between the outputs of said voltage source and said techometer, a second servo amplifier, means applying the output of said second comparator as an input to said second servo amplifier, a second servo motor coupled to and operated by the output from said second servo amplifier, and means coupling the output of said second servo motor to the variable speed ratio changer forming said first means to vary the setting thereof.

6. A power signal converter for a three-phase electric machine having a variable load which produces a voltage proportional to the power consumed by said machine in operating said load. Said converter comprising a first transformer having a primary winding and first and second secondary windings; means for connecting the primary winding of said first transformer across two of the three-phase inputs to said machine; an electron discharge device having at least first and second anodes, a control electrode and a cathode; means connecting one end of the first secondary winding of said first transformer to said first anode; means connecting one end of the second secondary winding of said first transformer to said second anode; first and second serially connected resistors; means connecting said serially connected first and second resistors between the other end of the first secondary winding and the other end of the second secondary winding of said first transformer; a third resistor connected between said cathode and the junction of said first and second resistors; a second transformer having a primary winding and a secondary winding; means connecting the primary winding of said second transformer in series with the third of the three-phase inputs to said machine, and a phase-shift network connecting the secondary winding of said second transformer between said control electrode and the junction of said first and second resistors, said network providing a phase shift such that the voltage between said control electrode and the junction of said first and second resistors is substantially in phase quadrature with the voltage between said anodes and the junciton of said first and second resistors when said machine is unloaded, whereby the voltage across said first and second serially connected resistors is proportional to the power consumed by said machine in operating said load.

7. A system for operating a movable load by a plurality of power elements operating simultaneously, which comprises said load, primary motive means, a mechanical speed changing drive connecting said motive means to said load, secondary motive means also coupled to and driving said load, means responsive to the speed of operation of said load for creating a circuit condition that varies in a characteristic which is proportional to said speed, means having a circuit characteristic which corresponds to a desired speed for said load, means responsive to a comparison of said last two identified means and operating said mechanical speed changing drive for varying the speed at which said primary motive means drives said load, means for comparing the currents used in operating both of said motive means, and means responsive automatically to said comparison for varying the speed at which said secondary motive means operates said load until the current used in operating said secondary motive means bears a selected proportion to the current used to operate said primary motive means.

8. A system for operating a movable load by a plurality of power elements operating simultaneously, which comprises primary motive means, a mechanical speed changing device operated by said motive means and having a drive coupling by which it may operate said load, secondary motive means having a drive coupling by which it may also operate said load, means having a drive coupling by which it may be operated by said load and operable to set up an electric circuit condition which is proportional to the speed of said load, a source of another electric circuit condition proportional to a selected standard speed for said load, means responsive to said electric circuit condition and said source operating said mechanical speed changing drive to vary the speed at which said primary motive means may operate said load until the speed of said load equals said standard speed, means for comparing the power consumed by said primary and secondary motive means in operating said load, and means automatically controlled by said comparing means for varying the speed at which said secondary motive means may operate said load until the power consumed by said secondary motive means when operating said load bears a selected proportion to that consumed by said primary motive means when operating said load.

9. A system for operating a movable load by a plurality of power elements operating simultaneously, which comprises a primary motor, a variable speed drive coupling said motor to said load, an operating electric circuit for said motor, a secondary motor, a variable speed drive coupling said secondary motor to said load, an operating electric circuit for said secondary motor, means for adjusting said first variable speed drive to cause the load to be driven at a selected but adjustable basic speed, phase discriminator means associated with the circuit for said primary motor and having an output circuit, another phase discriminator means associated with the circuit for said secondary motor and having an output circuit, means for comparing the output circuits of said discriminators, and means automatically responsive to said comparison of circuits for varying said variable speed drive between said secondary motor and said load to increase or decrease the speed at which said secondary motor drives the load as necessary to establish a selected power drive ratio between said motors.

10. The system as set forth in claim 9, wherein said automatically responsive means includes a servo-amplifier, a servo motor controlled by said amplifier, and an operative control between said servo motor and said variable speed drive between the secondary motor and said load.

11. An automatic load equalization device for a driven mechanism operated by a plurality of separate prime movers, which comprises a device to be driven, a primary electric drive motor, a secondary electric drive motor, an individual variable speed ratio changer connecting each of said motors to said device, to be driven for jointly operating said device, a servo motor operatively connected to each speed changer to operate the latter and change the speed at which that speed changer operates said device to be driven, a tachometer operated in synchronism with said device, a calibrated adjustable voltage source, means for continuously comparing the voltages of said calibrated source and said tachometer and connected to said servo motor for the primary motor to operate that servo motor to vary the speed at which said primary motor operates said device through its variable speed ratio changer and keep the speed of said device at a selected speed determined by said calibrated source, means for electrically comparing the power consumed by each of said motors, and operating said servo motor for said speed changer that connects the secondary motor to said device, to vary the speed at which the secondary motor drives said device in a manner to maintain the same ratio of operating power supplied to said device by said secondary motor.

References Cited in the file of this patent

UNITED STATES PATENTS

| | | |
|---|---|---|
| 1,631,752 | Merrill | June 7, 1927 |
| 2,350,913 | Mercer | June 6, 1944 |
| 2,484,089 | Haynes | Oct. 11, 1949 |
| 2,551,620 | Meinema | May 8, 1951 |

FOREIGN PATENTS

| | | |
|---|---|---|
| 518,176 | Great Britain | Feb. 20, 1940 |